Feb. 15, 1966  G. R. LUCAS ETAL  3,235,403
COATED STEEL STRAP
Filed April 20, 1962
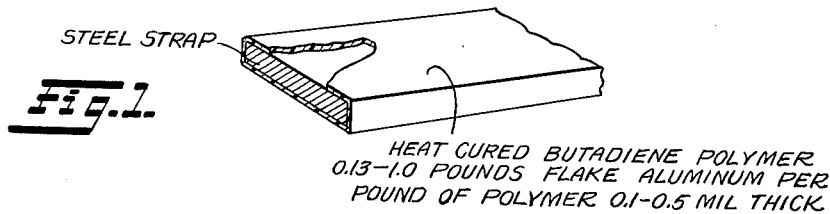
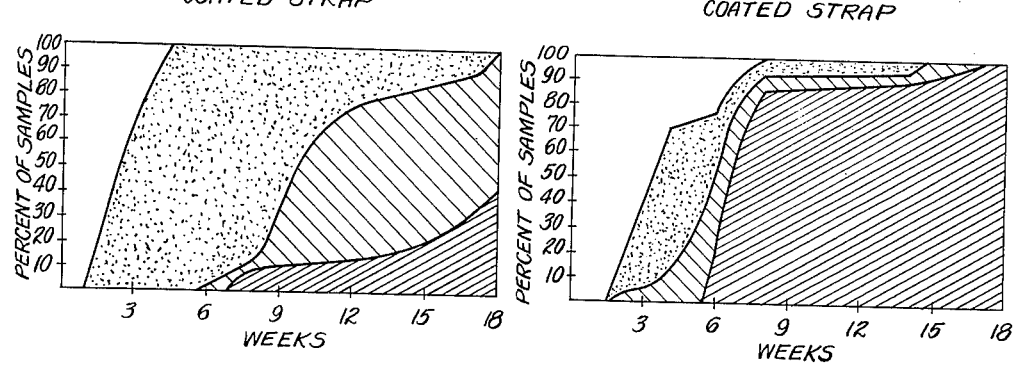
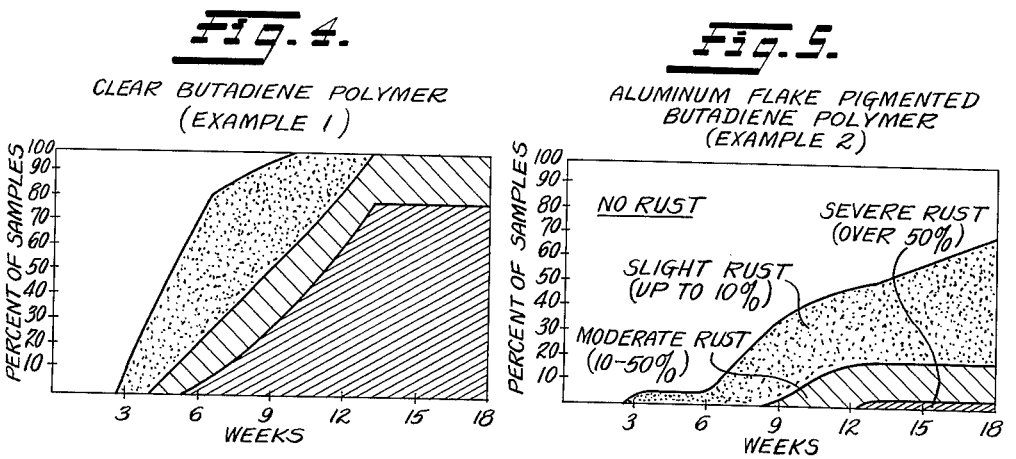
INVENTORS
GLENNARD R. LUCAS
LAWRENCE S. SHELTON
BY Schneider, Dressler, Goldsmith & Clement
ATTORNEYS

United States Patent Office 3,235,403
Patented Feb. 15, 1966

3,235,403
COATED STEEL STRAP
Glennard R. Lucas, Glenview, and Lawrence S. Shelton, Morton Grove, Ill., assignors to Signode Corporation, a corporation of Delaware
Filed Apr. 20, 1962, Ser. No. 189,000
1 Claim. (Cl. 117—128.4)

The present invention relates to ligatures which are coated with a thin film of organic resinous coating to provide a durable and weather resistant product. More particularly, the invention relates to strap and especially steel strap having a continuous and uniform coating having a thickness of from 0.1–0.5 mil, preferably from 0.2–0.4 mil.

The invention is especially directed to the production of thin flexible and weather resistant coatings utilizing butadiene polymers and copolymers, especially partially oxidized copolymers of butadiene and styrene of relatively low molecular weight. These butadiene polymers are preferably cured by exposure to elevated curing temperatures above 600° F., preferably above 650° F.

Despite the excellent physical properties which are achieved using the butadiene copolymers referred to above, it has been found that although these copolymers uniquely provide the adhesion, flexibility and toughness which is required in accordance with the invention, that the clear unpigmented resin and even the resin with conventional pigmentation is not adapted to provide adequate weathering resistance upon the application of a feasible thickness of coating material.

In accordance with the invention, the butadiene copolymer is applied in a pigmented form, the pigment being selected to be a finely divided flake aluminum which is present in small proportions of at least 0.5 pound per gallon, preferably at least 1 pound per gallon. Because of the cost of aluminum flake, it is not feasible to employ a heavy pigmentation. Thus, the aluminum pigment should be used in an amount of not more than 4 pounds per gallon, preferably not more than 2 pounds per gallon. In preferred practice of the invention, 1–2 pounds per gallon of the finely divided flake aluminum is employed in a system in which resin and volatile solvent are present in about equal weight proportions. Of course, in the heat cured product the volatile solvent has been removed and the cured butadiene polymer should contain from 0.14–1.0, preferably from 0.26–0.52 pound of flake aluminum per pound of polymer.

By finely divided flake aluminum is meant an aluminum flake in a sufficiently finely divided condition to permit it to pass through a 400 mesh screen. The finer the aluminum flake, the better are the results achieved in accordance with the invention.

The aluminum flake may be employed in either leafing or non-leafing form.

It would appear that the finely divided flake aluminum permits thin films of the butadiene polymer to be applied to provide a flexible and strongly adherent film having sufficient physical toughness to resist galling as a result of the conventional manipulations applied to the coated strap by strap handling tools. Also, the presence of the aluminum flake pigment permits very thin films of coating material to more adequately surround the edges of the strap and to cover imperfections in the strap. Thus, the strap is more uniformly coated and the coating itself functions to provide superior weathering resistance. Uniquely, small proportions of the flake aluminum permit thin films of heat cured butadiene polymer to provide exceptional weathering reistance.

Referring more particularly to the butadiene polymers and copolymers which are preferably employed in accordance with the invention, these are oily butadiene polymers characterized by an average molecular weight of from 1,000 to about 30,000 and which contain at least 75% by weight of copolymerized butadiene-1,3, any balance of the copolymer being constituted by copolymerizable monoethylenically unsaturated monomer. Notably, in addition to butadiene, about 10% by weight of the copolymer is desirably constituted by styrene, although other olefins copolymerizable with butadiene such as vinyl toluene, etc., may be employed. If desired, small proportions ranging up to about 2% of ethylenic monomers including the carboxyl group and especially dicarboxylic acid anhydrides, such as maleic anhydride or citraconic anhydride may be employed.

The preferred polymers are oily liquid polymers having an average molecular weight ranging from about 5,000 to about 15,000 and containing butadiene and styrene in a weight ratio of about 90/10.

It is preferred to partially oxidize the butadiene polymers and copolymers by bubbling air or other oxygen-containing gas through a heated mass of the copolymer until the oxygen content of the polymer or copolymer is up to about 10% by weight, but usually up to about 2–3% by weight. Conveniently, oxygenation is continued until the product has an acid number in the range of from 5–25, preferably in the range of from 8–20.

By average molecular weight, it is intended to refer to the molecular weight determined by boiling point elevation in ethylene dichloride.

The butadiene copolymer may be employed alone or in combination with other synthetic resins, especially solvent-soluble, heat-hardenable urea-formaldehyde resins which, as is well known, are provided by condensing urea with an excess of formaldehyde and then etherifying the product with a $C_3$–$C_8$ alcohol to provide solvent solubility to permit the urea-formaldehyde resin to be placed in compatible organic solvent solution with the butadiene polymer or copolymer.

Aluminum pigmentation in accordance with the invention, provides at low levels of pigmentation, a substantially superior strap in terms of outdoor weathering. Improved corrosion resistance to acid, alkali and industrial fumes is also achieved and is of value in special circumstances where such agents are encountered. Especial attention is directed to the stability of the aluminum-pigmented coated strap in its use for strapping wood products under conditions of outdoor storage where dilute acids cause rapid failure of conventional painted strap. In this vigorous environment, a distinct improvement is provided by the invention.

While the resins used in the invention are superior to many known coating materials in clear form, the miner proportion of aluminum pigmentation provided by the invention provides a very significant improvement in weather resistance as is clearly shown by a comparison of the accompanying graphs.

Referring more particularly to the drawings, FIG. 1 is a perspective view showing a steel strap coated in accordance with the invention and including appropriate legends.

FIGS. 2, 3, 4 and 5 are a series of graphs which illustrate the unique weathering resistance achieved by the invention, all of these graphs have the same scale and using corresponding hatching to identify the same extent of rusting.

More particularly, FIG. 2 is a graph showing the weathering resistance of a commercially available black pigmented coated strap;

FIG. 3 is a graph showing the weathering resistance of commercially available nylon coated strap;

FIG. 4 is a graph showing the weathering resistance of the clear butadiene polymer-coated strap produced in Example 1 of the present disclosure; and FIG. 5 corresponds to FIG. 4 with the exception that the butadiene polymer is pigmented with aluminum flake as described in Example 2 of the present disclosure.

Referring more particularly to the graphs, FIG. 2 shows that commercially available black painted strap shows traces of rusting after about a week's exposure. After about six weeks' exposure moderate rusting begins. After eighteen weeks all of the strap is at least moderately rusted and almost one-half of the strap is severely rusted.

From FIG. 3, it will be seen that commercially available nylon coated strap does not begin to rust for a little over a week but, thereafter, rusting is rapid and severe. After nine weeks over 80% of the strap is severely rusted.

FIGS. 4 and 5 have special significance because these show the products of Examples 1 and 2 of the present disclosure and, hence, they compare the same strap, coated with the same resin at the same coating weights, using the same equipment and with exposure to outdoor weathering at the same location at the same time. The unique superiority provided by aluminum flake pigmentation in accordance with the invention is clearly evident. Thus, the results pictured in FIG. 5 are markedly outstanding in comparison with the commercial products of FIGS. 2 and 3 and also with the Example 1 product whose weathering resistance is shown in FIG. 4. Thus, and specifically comparing the clear coated product of FIG. 4 with the aluminum flake pigmented product of FIG. 5, the following becomes clear.

After 6 weeks' exposure of the clear coated product, 70% of the specimens showed slight corrosion, but less than 10% of the pigmented product was affected at all. After 13 weeks, 80% of the clear coated product specimens were severely corroded, but less than 5% of the pigmented specimens were severely corroded.

The samples of strap were steel strap ¾" x .031" coated with the coating materials of Examples 1 and 2 to a thickness of 0.30 mil.

In brief, only the aluminum pigmented coated products show very superior outdoor weathering resistance through 5 months of outdoor exposure.

The pigmented coating materials provide better edge coverage and produce fewer surface imperfections. Because of its better coverage, it is more adaptable to rough surfaced steel and to steel surfaces which are slightly contaminated.

It is desired to point out that the present invention is based on the finding that small proportions of finely divided flake aluminum provide uniquely superior results in combination with the specific heat cured butadiene polymers which are the subject of the invention. Thus, other pigments are not the equivalent of aluminum flake in accordance with the invention and they do not provide the same results. However, the present invention permits the further pigmentation of the coating solutions which are used to include pigments and/or dyes other than the aluminum flake which is essential to the invention. Thus, the invention does not preclude the presence of other pigments such as titanium dioxide and carbon black to obtain a desired color or to achieve ornamental effects. Moreover, the invention also does not preclude after treatment of the coated strap as is illustrated by printing or waxing.

The invention will be illustrated in the examples which follow:

*Example 1*

A clear coating composition is produced by mixing 2 gallons of coating solution containing a partially oxidized copolymer of butadiene and styrene in weight proportions of 90/10 and having an average molecular weight of approximately 9,000 in 50% organic solvent solution in a solvent mixture containing Solvesso 100 and isopropanol in a weight ratio of 3/1. This partially oxidized copolymer has an acid number of 10.

To the mixture of partially oxidized butadiene-styrene copolymer is added 2 gallons of Solvesso 100 to provide a coating solution having a viscosity measured in a #1 Zahn Cup at 25° C. of 37 seconds.

*Example 2*

Example 1 is repeated employing a pigmented coating solution prepared in the same manner as the clear coation solution described in Example 1, but with the exception that prior to admixture, 4 pounds of aluminum paste are premixed with a partially oxidized butadiene-styrene copolymer and the pigmented solution is permitted to stand for about 16 hours before approximately 2 gallons of Solvesso 100 are added to reduce the viscosity to 37 seconds in a #1 Zahn Cup at 25° C.

In the foregoing examples, "Solvesso 100" is a commerical mixed aromatic hydrocarbon solvent, including a minor amount of aliphatic solvent. Typical physical data for Solvesso 100 is shown in the listing which follows:

| | |
|---|---|
| Specific gravity at 60/60° F. | 0.8749 |
| Flash, ° F. (tag closed cup) min. | 100 |
| Distillation ASTM (D268): | |
| Initial boiling point, ° F. | 306 |
| 10% | 311 |
| 50% | 317 |
| 90% | 327 |
| Dry point, ° F. | 343 |
| Viscosity, cp., at 25° C. | 0.797 |
| K–B value (toluol=100) | 90 |
| K–B value (after 75% is evaporated) | 98 |
| Mixed aniline point, ° C. | 12.0 |
| Percent aromatics | 99.5 |

The clear and pigmented coating solutions were applied to steel strap in a thickness of 0.3 mil and cured in a convection oven for 1 minute at about 700° F. The strap was ¾ inch steel strap having a thickness of 0.031 inch.

The weathering results obtained for the coated straps of Examples 1 and 2 are shown in the accompanying drawings which have been previously discussed.

The invention is defined in the claim which follows:

We claim:

Steel strap characterized by superior weather resistance, said strap being coated with a solid resinous film having a thickness of from 0.2–0.4 mil, said film comprising oily butadiene-styrene copolymer containing at least 75% by weight of copolymerized butadiene-1,3 and having an average molecular weight of from about 1,000 to about 30,000 and partially oxidized to provide an acid number of from 5–25, said butadient-styrene copolymer containing from 0.26–0.52 pound of dispersed finely divided flake aluminum per pound of copolymer, said oily butadiene-styrene copolymer being cured at temperatures in excess of 600° F.

References Cited by the Examiner

UNITED STATES PATENTS

| | | | |
|---|---|---|---|
| 2,652,342 | 9/1953 | Gleason | 117—132 |
| 2,878,141 | 3/1959 | Canniff | 117—132 |
| 2,895,979 | 7/1959 | Segraves et al. | 106—285 XR |
| 3,035,013 | 5/1962 | Cull et al. | 117—132 |
| 3,073,719 | 1/1963 | Albright et al. | 117—132 |

OTHER REFERENCES

Aluminum Paint Manual, A.1.A. file No. 25B252, Aluminum Company of America 1940, TP936, A47, 1940 pp. 14, 15, 51, 53.

RICHARD D. NEVIUS, *Primary Examiner.*